United States Patent
Gao et al.

(10) Patent No.: US 9,052,967 B2
(45) Date of Patent: Jun. 9, 2015

(54) DETECTING RESOURCE DEADLOCKS IN MULTI-THREADED PROGRAMS BY CONTROLLING SCHEDULING IN REPLAY

(75) Inventors: Qi Gao, Columbus, OH (US); Min Xu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 618 days.

(21) Appl. No.: 12/848,023

(22) Filed: Jul. 30, 2010

(65) Prior Publication Data
US 2012/0030657 A1  Feb. 2, 2012

(51) Int. Cl.
G06F 9/52  (2006.01)
G06F 11/36  (2006.01)

(52) U.S. Cl.
CPC .......... *G06F 9/524* (2013.01); *G06F 11/3636* (2013.01)

(58) Field of Classification Search
CPC .......................... G06F 9/524; G06F 11/3636
See application file for complete search history.

(56) References Cited

U.S. PATENT DOCUMENTS

| | | | | | |
|---|---|---|---|---|---|
| 4,189,771 | A | * | 2/1980 | Roever | 718/104 |
| 5,263,155 | A | * | 11/1993 | Wang | 707/695 |
| 5,440,726 | A | * | 8/1995 | Fuchs et al. | 714/20 |
| 5,440,743 | A | * | 8/1995 | Yokota et al. | 710/200 |
| 5,459,871 | A | * | 10/1995 | Van Den Berg | 718/104 |
| 5,530,802 | A | * | 6/1996 | Fuchs et al. | 714/17 |
| 5,590,277 | A | * | 12/1996 | Fuchs et al. | 714/38.13 |
| 5,664,088 | A | * | 9/1997 | Romanovsky et al. | 714/13 |
| 5,682,537 | A | * | 10/1997 | Davies et al. | 710/200 |
| 5,835,766 | A | * | 11/1998 | Iba et al. | 718/104 |
| 5,845,117 | A | * | 12/1998 | Fujita | 718/107 |
| 5,905,855 | A | * | 5/1999 | Klaiber et al. | 714/31 |
| 6,101,524 | A | * | 8/2000 | Choi et al. | 718/102 |
| 6,343,371 | B1 | * | 1/2002 | Flanagan et al. | 717/124 |
| 6,593,940 | B1 | * | 7/2003 | Petersen et al. | 715/700 |
| 6,615,373 | B2 | * | 9/2003 | Elko et al. | 714/47.3 |
| 6,704,841 | B2 | * | 3/2004 | Chaudhry et al. | 711/137 |
| 6,832,367 | B1 | * | 12/2004 | Choi et al. | 717/130 |
| 6,854,108 | B1 | * | 2/2005 | Choi | 717/125 |
| 6,912,648 | B2 | * | 6/2005 | Hammarlund et al. | 712/219 |
| 6,978,444 | B1 | * | 12/2005 | Farchi et al. | 717/129 |
| 7,155,641 | B2 | * | 12/2006 | Prang et al. | 714/47.1 |
| 7,337,290 | B2 | * | 2/2008 | Rajamani et al. | 711/163 |
| 7,506,318 | B1 | * | 3/2009 | Lindo et al. | 717/130 |
| 7,512,748 | B1 | * | 3/2009 | Mason et al. | 711/151 |

(Continued)

OTHER PUBLICATIONS

Bensalem, Saddek et al., Confirmation of Deadlock Potentials Detected by Runtime Analysis ACM, PADTAD-IV, Jul. 17-20, 2006.*

(Continued)

*Primary Examiner* — Scott L Jarrett

(57) ABSTRACT

A method and system for determining potential deadlock conditions in a target multi-threaded software application. The target application is first run in a virtual machine and the events within the application are recorded. The recorded events are replayed and analyzed to identify potential lock acquisition conflicts occurring between threads of the application. The potential lock acquisition conflicts are identified by analyzing the order in which resource locks are obtained and pairs of resources that have respective locks obtained in different orders are analyzed. These analyzed pairs are used to define a different order of events in the target application that, when the target application is re-run with the second order of events, may trigger a deadlock condition. The target application is then re-run with the different order of events in an attempt to trigger and then identify potential deadlock situations.

33 Claims, 8 Drawing Sheets

(56) References Cited

U.S. PATENT DOCUMENTS

| | | | |
|---|---|---|---|
| 7,516,446 B2 * | 4/2009 | Choi et al. | 717/128 |
| 7,574,697 B2 * | 8/2009 | Biberstein et al. | 717/130 |
| 7,673,181 B1 * | 3/2010 | Lindo et al. | 714/38.13 |
| 7,770,064 B2 * | 8/2010 | Harper et al. | 714/15 |
| 7,774,647 B2 * | 8/2010 | Vertes | 714/15 |
| 7,840,940 B2 * | 11/2010 | Vertes | 717/120 |
| 7,962,615 B1 * | 6/2011 | Lehr et al. | 709/224 |
| 7,966,615 B2 * | 6/2011 | Venkitachalam et al. | 718/1 |
| 8,201,169 B2 * | 6/2012 | Venkitachalam et al. | 718/1 |
| 8,402,318 B2 * | 3/2013 | Nieh et al. | 714/38.1 |
| 8,468,501 B2 * | 6/2013 | Subhraveti | 717/125 |
| 8,656,222 B2 * | 2/2014 | Chow et al. | 714/38.1 |
| 8,732,670 B1 * | 5/2014 | Daudel et al. | 717/127 |
| 2004/0002974 A1 * | 1/2004 | Kravitz et al. | 707/8 |
| 2006/0101331 A1 * | 5/2006 | Wang et al. | 715/513 |
| 2006/0218556 A1 * | 9/2006 | Nemirovsky et al. | 718/104 |
| 2007/0106667 A1 * | 5/2007 | Jain et al. | 707/8 |
| 2008/0282244 A1 * | 11/2008 | Wu et al. | 718/100 |
| 2009/0144706 A1 * | 6/2009 | Pastorelli | 717/128 |
| 2010/0057965 A1 * | 3/2010 | Nir-Buchbinder et al. | 710/200 |
| 2011/0067008 A1 * | 3/2011 | Srivastava et al. | 717/128 |
| 2011/0271284 A1 * | 11/2011 | Simonian | 718/102 |

OTHER PUBLICATIONS

Bensalem, Saddek et al., Scalable Dynamic Deadlock Analysis of Multi-Threaded Programs Parallel and Distributed Systems: Testing and Debugging, PADTAD-3, 2005.*
Mani, Nariman et al., Testing Multi-Agent Systems for Deadlock Detection Based on UML Models 14th International Conference on Distributed Multimedia Systems (DMS 08), 2008.*
Mount, John, Automatic Detection of Potential Deadlock Dr. Dobb's Journal, Dec. 1, 2000.*
Schuppan, Viktor et al., JVM Independent Replay in Java Journal Electronic Notes in Theoretical Computer Science, vol. 113, Jan. 2005.*
Li Tong et al., Pulse: A Dynamic Deadlock Detection Mechanism Using Speculative Execution USENIX'05, 2005.*
Harrow, Jerry J. Jr., Runtime Checking of Multithreaded Applications with Visual Threads Proceedings of the 7$^{th}$ International SPIN Workshop on SPIN Model Checking and Software Verification, 2000.*
Lin, Yuan, Data Race and Deadlock Detection with Sun Studio Thread Analyzer Sun Microsystems, Mar. 2008.*
Agarwal, Rahul et al., Run-Time Detection of Potential Deadlocks for Programs with Locks, Semaphores and Condition Variables, ACM, PADTAD-IV,Jul. 17, 2006.*
Sun Studio 12: Thread Analyzer User's Guide Sun Microsystems, Inc., 2007.*
Rockel, Ingo, TDA—Thread Dump Analyzer Sep. 2008.*
Dunlap, George W. et al., Execution Replay for Multiprocessor Virtual Machines VEE'08, ACM, Mar. 5-7, 2008.*
Alpern, Bowen et al., DejaVu: Deterministic Java Replay Debuger for Jalapeno Java Virtual Machine ACM, OOPSLA, 2000.*
Bruening, Derek L., Systematic Testing of Multithreaded Java Programs Massachusetts Institute of Technology, May 21, 1999.*
Xu, Min et al., ReTrace: Collecting and Executing Trace with Virtual Machine Deterministic Replay Workshop on Mondeling, Benchmarking and Simulation, Jun. 2007.*
Scales, Daniel J. et al., The Design and Evaluation of a Practical System for Fault-Tolerant Virtual Machines VMWare, Technical Report, May 11, 2010.*
LeBlanc, Thomas J. et al., Debugging Parallel Programs with Instant Replay IEEE Transactions on Computers, vol. V-36, No. 4, Apr. 1987.*
McDowell, Charles E. et al., Debugging Concurrent Programs ACM Computer Surveys, vol. 21, No. 4, Dec. 1989.*
Netzer, Robert H.B et al., Optimal Tracing and Incremental Reexecution for Debugging Long-Runing Programs Brown University, Mar. 1994.*
Choi, Jon-Deok et al., Deterministic Replay of Java Multithreaded Applications ACM, SPDT'98, 1998.*
Ronsse, Michiel et al., Non-instrusive on-the-fly data race detection using execution replay Proceedings of the Fourth International Workshpp on Automated Debugging, AADEBUG 2000, Aug. 2000.*
Prvulovic, Milos et al., ReEnact: Using Thread-Level Speculation Mechanisms to Debug Data Races in Multithreaded Codes Proceedings of the 30$^{th}$ Annual International Symposium on Computer Architecture, Jun. 2003.*
JaReC: a record/replay system for multithreaded java applications Software Practice & Experience Archive, vol. 34, No. 6, May 2004.*
Narayanasamy, Satish et al., BugNet: Continuously Recording Program Execution for Deterministic Replay Debugging Proceedings of the International Symposium on Computer Architecture, Jun. 2005.*
Dunla, George Washington III, Execution replay for instrusion analysis The University of Michigan, 2006.*
Dunlap, George W. et al., Execution Replay for Multiprocessor Virtual Machines ACOM, VEE'08, Mar. 5-7, 2008.*
Liu, Haikum et al., XenLR: Xen-based Logging for Deterministic Replay Japan-China Joint Workshop on Frontier of Computer Science and Technology, 2008.*
VMware Fault Tolerance Recommendations and Considerations on VMware vSphere 4 VMWare, Whitepaper, 2009.*
Lei, Yut et al., Reachability Testing of Concurrent Programs IEEE Transactions on Software Engineering, vol. 32, No. 6, Jun. 2006.*
Ronsse, Michiel et al., Non-Intrusive Detection of Synchronization Errors Using Execution Replay Automated Software Engineering, vol. 9, 2002.*
Narayanasamy, Satish et al., BugNet: Recording Application-Level Execution for Deterministic Replay Debugging IEEE Computer Society, 2006.*
Huang, Jeff et al., LEAP: The Lightweight Deterministic Multiprocessor Replay of Concurrent Java Programs ACM, FSE-18, Nov. 7-11, 2010.*
Narayanasamy, Satish et al., BugNet: Continuously Recording Program Execution for Deterministic Replay Debugging IEEE, 2005.*
Edelstein, O. et al., Multithreaded Java program test generation IBM Systems Journal, vol. 41, No. 1, 2002.*

* cited by examiner

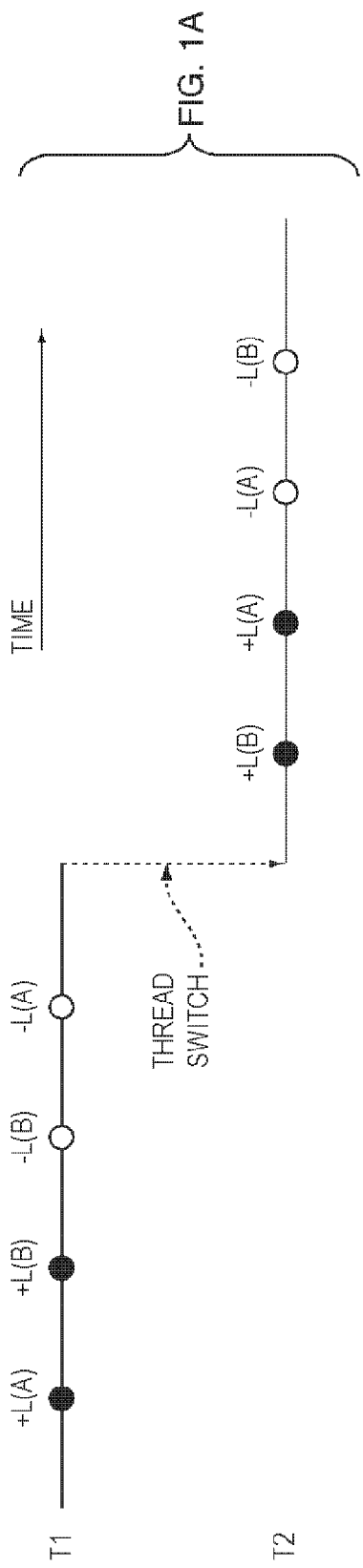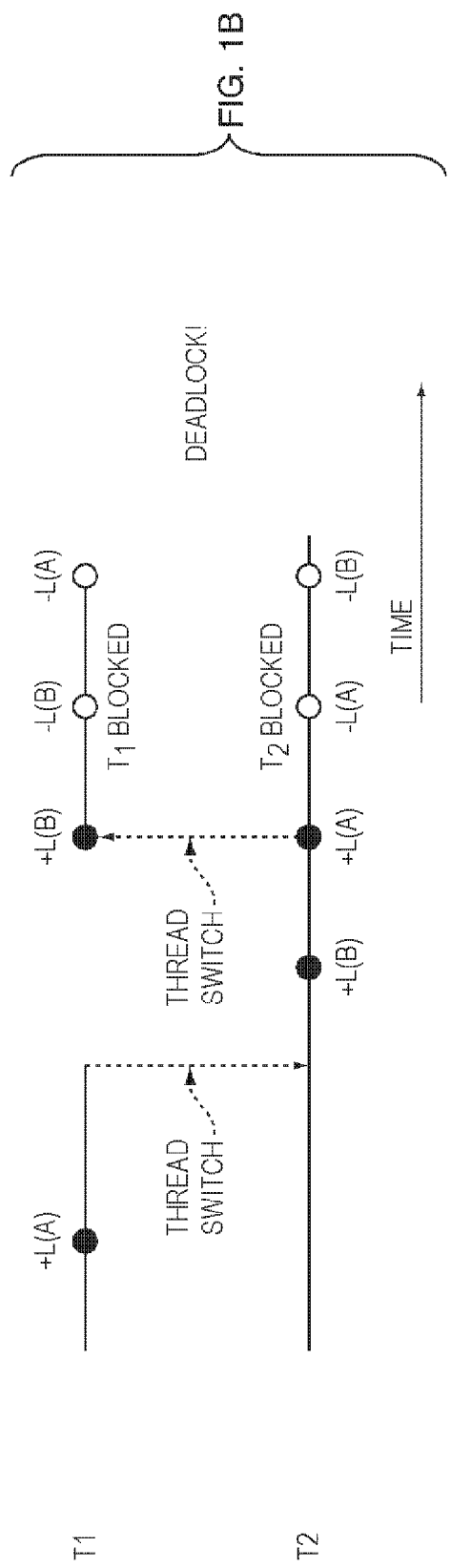

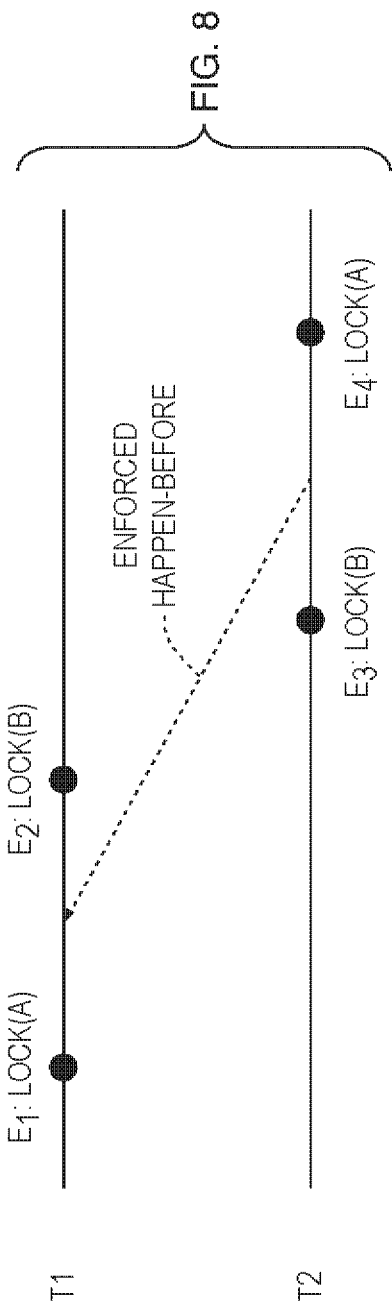

DETECTING RESOURCE DEADLOCKS IN MULTI-THREADED PROGRAMS BY CONTROLLING SCHEDULING IN REPLAY

FIELD OF THE INVENTION

Embodiments of the present invention relate generally to the field of testing software to identify deadlock conditions by leveraging a virtualized computer system.

BACKGROUND OF THE INVENTION

A deadlock condition occurs in a multi-threaded computer program when each of two or more threads has an action pending that is dependent on the action of the other finishing before it can proceed. Needless to say, the occurrence of a deadlock condition causes problems for users. Unfortunately, due to non-determinism in multi-threaded programs, effectively detecting potential deadlocks ahead of their happening remains a great challenge in software testing.

A deadlock is one type of concurrency bug caused by a synchronization error. Mutually exclusive (mutex) locks are becoming pervasively used to protect shared data thus requiring synchronizing the accesses to them from different threads. Mistakes made in using mutex locks can cause multiple threads to each enter a deadlock situation, where each thread is blocked when requesting a lock held by another blocked thread.

For purposes of background explanation, referring now to FIG. 1A, deadlock-free operation occurring between two threads T1 and T2 is visually presented. Here, where time is moving from left to right, thread T1 first obtains a lock on resource A, +L(A), then obtains a lock on resource B, +L(B). Thread T1 then releases, −L(B), −L(A), these locks before thread T2 needs access to the resources A and B.

As shown in FIG. 1B, however, a deadlock occurs where thread T1, for example, has obtained the lock on resource A, +L(A), and thread T2 has obtained the lock on resource B, +L(B). Subsequently, when thread T1 attempts to obtain a lock on resource B, +L(B), it cannot because thread T2 has not yet released resource B and thread T2 cannot obtain a lock on resource A, +L(A), because thread T1 has not yet released resource A. As neither of threads T1 and T2 can continue without, respectively, +L(B) and +L(A), they are deadlocked with respect to one another and no processing is taking place.

In practice, deadlock is generally hard to predict or detect mainly due to an inherently imperfect knowledge of synchronization within a multi-threaded environment. Sometimes acquiring multiple locks in a different order is deadlock-prone, while sometimes the acquisition order does not matter.

Deadlock can cause severe problems for end users. A software system in deadlock usually stops responding to client requests, which can directly cause customer dissatisfaction. In addition, a deadlock in one software component can cause other related components to hang and thereby lead to a chain reaction of hanging. Detecting and diagnosing deadlocks is usually non-trivial in software deployed for a production run. In complex execution environments, there is often no good way to determine whether a system is deadlocked or just running very slowly. Even if is it determined that the system is deadlocked, it is still very difficult to identify the root cause, given there are many components interacting with each other.

Although it is possible to develop deadlock-free code, it is quite challenging to do so in practice. Applying a set of strict coding rules for avoiding deadlocks, for example, may cause other complexities and inefficiencies in the design and may not be favorable in many situations. In addition, a large number of developers in different teams must all follow the coding rules to make them effective. Furthermore, when third party libraries are involved, allowing some exceptions to the coding rules may be the only choice for making things work together.

Therefore, in order to avoid the deadlock situation, it is imperative for software vendors to be equipped with techniques that not only detect as many potential deadlocks as possible in testing, but also provide helpful information to developers for fixing them.

Relying on traditional software testing to detect deadlock bugs dynamically, however, is not effective due to the limited test coverage. Although a deadlock detection tool based on a dependency graph can accurately detect a deadlock situation, it is only useful when the test case actually triggers the deadlock. For concurrent software, due to thread interleaving, the number of possible execution paths is astronomically large. As a result, the test cases usually can only cover a small percentage of the possible conditions and often fail to expose the specific event sequence to trigger the hidden deadlocks. Furthermore, even if a test triggers the deadlock by chance, it is still very difficult for programmers to debug because the bug may be hard to consistently reproduce.

Another way to detect deadlock is to perform stricter checking and conservatively report the potential deadlocks. One way to check potential deadlock is to detect lock order violations, i.e., multiple threads acquire the same set of locks in different orders. This can be done either through static analysis of source code or dynamic checkers running with the test cases. Although this approach can increase the test coverage, it is likely to generate a large number of false alarms, i.e., those cases where a lock order violation cannot cause a deadlock due to other synchronization mechanisms. Verifying each warning manually could be a very tedious task for programmers.

BRIEF SUMMARY OF THE INVENTION

Embodiments of the present invention provide a method and system for determining potential deadlock conditions in a target multi-threaded software application. The target application is first executed or run in a virtual machine and the events within the application are recorded. The recorded events are replayed and analyzed to identify potential lock acquisition conflicts occurring between threads of the application. The potential lock acquisition conflicts are identified by analyzing the order in which resource locks are obtained and pairs of resources that have respective locks obtained in different orders are used to establish different orders of events in the target application that may trigger a deadlock. The target application is then re-run with the different order of events to possibly trigger and then identify potential deadlock situations.

BRIEF DESCRIPTION OF THE SEVERAL VIEWS OF THE DRAWINGS

Various aspects of at least one embodiment of the present invention are discussed below with reference to the accompanying figures. In the figures, which are not intended to be drawn to scale, each identical or nearly identical component that is illustrated is represented by a like numeral. For purposes of clarity, not every component may be labeled in every drawing. The figures are provided for the purposes of illustration and explanation and are not intended as a definition of the limits of the invention. In the figures:

FIGS. 1A and 1B represent, respectively, deadlock-free and deadlock operation;

FIG. 8 is a timeline representation of the operation of an embodiment of the present invention.

DETAILED DESCRIPTION OF THE INVENTION

Figure 2:
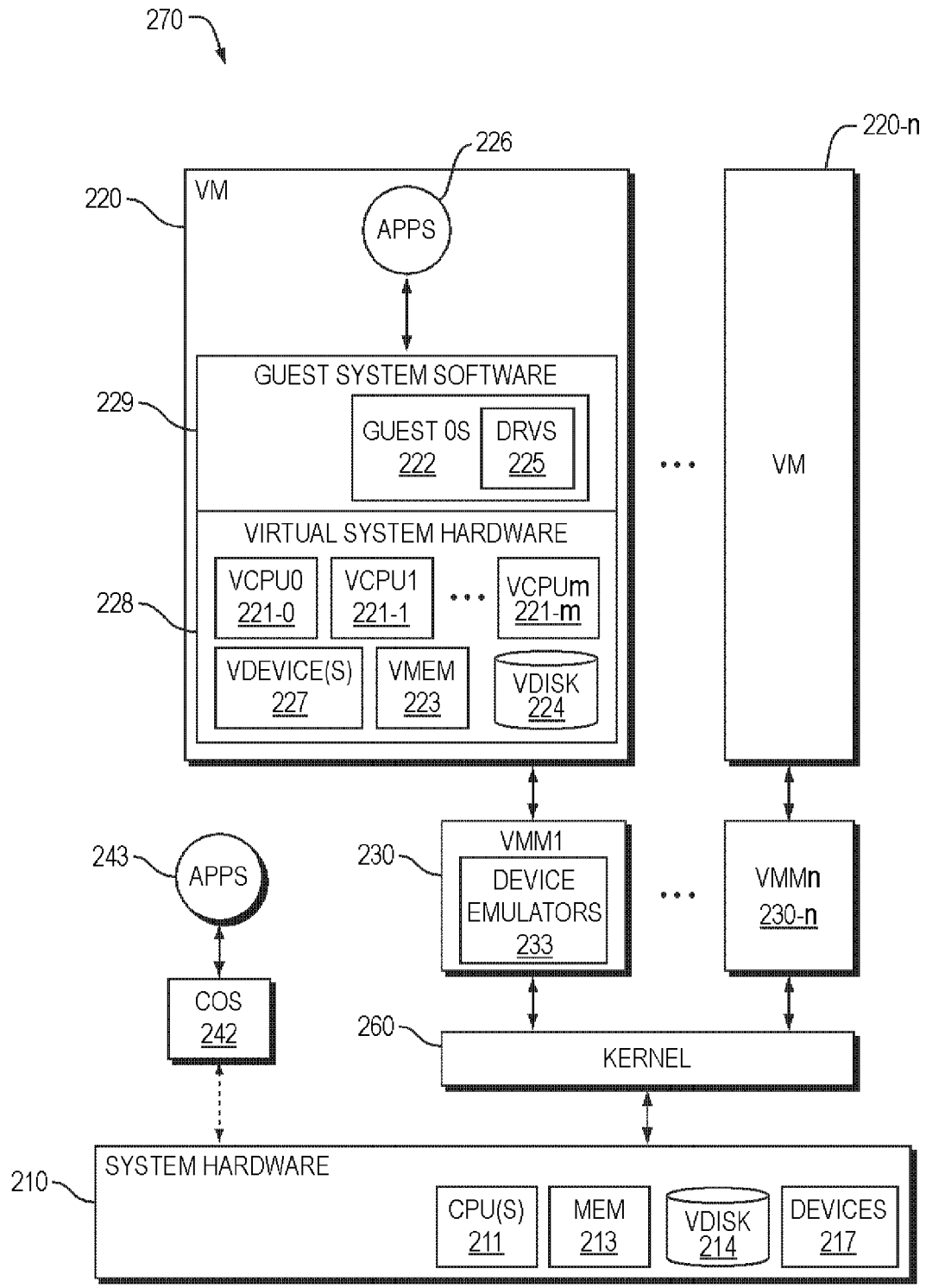
FIG. 2 is a block diagram representation of a known virtualization system.

As will be described below in more detail, embodiments of the present invention include a method that exposes the potential deadlocks by controlling the scheduling sequence of multi-threaded programs when replayed in a virtual system. This method expands the test coverage and does not report undue false positives. When compared to random testing or systematic testing, the present method is more efficient because it first analyzes the replayed execution and only explores those cases where a deadlock is likely to be triggered. Once the method triggers a deadlock, it not only provides detailed bug information, but also makes the deadlock execution consistently reproducible in replay.

A dynamic tool for deadlock detection and diagnosis achieves both minimal or no reporting of false positives and greatly enlarges test coverage. Rather than passively monitoring the execution and detecting deadlocks that happen naturally, the current system exposes the hidden deadlocks by actively controlling the thread scheduling in execution to meet the deadlock-triggering conditions. Embodiments of the present invention work with existing test cases of the multi-threaded program and expose the potential deadlocks that could possibly be triggered under different thread schedules. Exposed deadlocks can be consistently reproduced to provide debug information to programmers.

One advantage of the embodiments of the present invention is the analysis that allows the system to effectively and efficiently trigger deadlocks by controlling scheduling. Randomly inserting a thread switch is usually ineffective to trigger hidden deadlock cases. On the other hand, taking full control over the thread scheduling to systematically explore the possibilities is inefficient due to the large search space. Different from these two approaches, the present invention is guided by the analysis of runtime information so that the scheduling can be controlled and the deadlocks triggered by forcing a few thread switches at specific points, all as will be described below.

Embodiments of the present invention leverage the benefits and technology of a virtualized environment. As will be discussed below in more detail, embodiments based on record and replay features in a virtual machine, along with software instrumentation technology are implemented. Embodiments of the present invention leverage the record and replay feature in a virtual machine to deterministically re-generate the same execution as the software being analyzed and make scheduling changes based on that to trigger a deadlock condition.

As discussed below, embodiments of the present invention first replay the program execution to a point where a scheduling change is made, then the replay is stopped, the scheduling change is made, and the program continues from that point. In this manner, the program is executed with the thread scheduling that the analysis has identified as being likely to trigger the deadlock.

If a deadlock situation is reached under the modified scheduling, the bug is reported and a bug report is generated containing: a) the locks involved in the deadlock, b) the backtraces at the points where multiple threads acquire these locks in different orders, and c) the replay of original execution and the scheduling change performed to trigger the deadlock, which allows programmers to consistently reproduce the bug.

One system, in accordance with an embodiment of the present invention, has been implemented on a VMware workstation from VMware, Inc. of Palo Alto, Calif., in which VMware record/replay features are used to replay the execution of the program and the Vassert API is used to enable replay-time analysis and to control the go_live point in the application. Software instrumentation technology, e.g., Valgrind, is also implemented.

As embodiments of the present invention are implemented in a virtualized system, a brief overview of virtualization will now be presented. One of ordinary skill in the art will understand the workings of a virtualized system and this description is not intended to be an explanation of all details and is merely intended to provide a context for the description of the embodiment's present invention to follow. It should be appreciated that one or more embodiments of the present invention may be implemented wholly or partially in hardware, for example and without limitation, in processor architectures intended to provide hardware support for virtual machines (VM).

Although this specification describes translation processes for Intel processors, the details are similar for other popular x86 based processors, and embodiments of the invention may be implemented on any x86 or non-x86 based processor that supports virtual memory.

As is well known in the field of computer science, a virtual machine (VM) is an abstraction—a "virtualization"—of an actual physical computer system. One possible arrangement of computer system 270 that implements virtualization is shown in FIG. 2. A virtual machine (VM) or "guest" 220 is installed on a "host platform," or simply "host," which will include system hardware, that is, hardware platform 210, and one or more layers or co-resident components comprising system-level software, such as an operating system or similar kernel, or a virtual machine monitor or hypervisor (see below), or some combination of these. The system hardware typically includes one or more processors 211, memory 213, some form of mass storage 214, and various other devices 217.

Each VM 220, . . . , 220-*n* will typically have virtual system hardware 228 and guest system software 229. The virtual system hardware includes at least one virtual CPU, virtual memory 223, an optional virtual disk 224, and one or more virtual devices 227. Note that a disk—virtual or physical—is also a "device," but is usually considered separately because of the important role of the disk. All of the virtual hardware components of the VM may be implemented in software using known techniques to emulate the corresponding physical components. The guest system software includes guest operating system (OS) 222 and drivers 225 as needed for the various virtual devices 227.

Note that a single VM may be configured with more than one virtualized processor, as illustrated in FIG. 2, with multiple virtual processors 221-0, 221-1, . . . , 221-*m* (VCPU0, VCPU1, . . . , VCPUm) within VM 220. For example, symmetric multi-processor (SMP) systems exist wherein a hardware platform with multiple processors are connected to a shared main memory and shared devices. Similarly, VMs may be configured as SMP VMs. In addition, multi-processor systems exist in a so-called "multi-core" architecture, wherein more than one physical CPU is fabricated on a single chip and has its own set of functional units (such as a floating-point unit and an arithmetic/logic unit ALU), and where threads can be executed independently; multi-core processors typically share limited resources, such as some cache—VMs may be configured as multi-core systems. In addition, simultaneous execution of multiple threads in which more than one logical CPU operate simultaneously on a single chip, but in which the logical CPUs flexibly share one or more resources such as caches, buffers, functional units, and the like. One or more embodiments of may be used regardless of the type—physical and/or logical—or number of processors included in a VM.

Some interface is generally required between the guest software within a VM and various hardware components and devices in the underlying hardware platform. This interface—which may be referred to generally as "virtualization software" or "virtualization logic"—may include one or more software components and/or layers, possibly including one or more of the software components known as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in a host OS itself; moreover, there may also be specific support for virtualization in the system hardware. Unless otherwise indicated, embodiments may be used in virtualized computer systems having any type or configuration of virtualization software.

Virtual machine monitors 230, ..., 230-n appear, as shown in FIG. 2, as separate entities from other components of the virtualization software. Some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. Unless otherwise indicated, embodiments may be used in virtualized computer systems having any type or configuration of virtualization software. Moreover, embodiments are described and illustrated herein primarily as including one or more virtual machine monitors that appear as separate entities from other components of the virtualization software and perform certain functions relating to one or more embodiments. This is only for the sake of simplicity and clarity of explanation and by way of illustration—as mentioned above, the distinctions are not always so clear-cut, and the use of the term virtual machine monitor or just VMM is meant to encompass any component(s) in the virtualization software that perform the described functions, regardless of what name they are given. Again, unless otherwise indicated or apparent from the description, it is to be assumed that embodiments can be implemented anywhere within the overall structure of the virtualization software, and even in systems that provide specific hardware support for virtualization.

Various virtualized hardware components in the VM, such as the virtual CPU(s) VCPU0 221-0 to VCPUm 221-m, virtual memory 223, virtual disk 224, and virtual device(s) 227, are shown as being part of VM 220 for the sake of conceptual simplicity and ease of understanding. In actuality, these "components" are usually implemented as software emulations 233 included in VMM1 230.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 2). In a hosted virtualized computer system, an existing, general-purpose operating system forms a "host" OS that is used to perform certain input/output (I/O) operations, alongside and sometimes at the request of the VMM. The host OS, which usually includes drivers and supports applications of its own, and the VMM are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators, other components are often included in the VMM of a hosted virtualization system; many of these components are found in the VMM of a non-hosted system as well. For example, interrupt/exception handlers may be included to help context-switching, and a direct execution engine and binary translator with associated a translation cache may be included to provide execution speed while still preventing the VM from directly executing certain privileged instructions.

In this section, virtual machine record/replay and the VAssert API ("VAssert") will be generally described.

Virtual machine record/replay is a technique that allows for the execution of a whole virtual machine to be deterministically replayed later. It is achieved by recording all of the non-deterministic events during execution and feeding them back at the exact same points during replay. While there are other known replay techniques on the user level or kernel level, they are mainly for replaying one, or a few, processes by recording and feeding back their interactions with the OS kernel and other processes in the system. However, since there are many types of interactions among processes, as well as between user processes and the OS kernel, they generally still only support a subset of such interactions and operate under certain assumptions.

Virtual machine record and replay is more comprehensive in the sense that the state of the whole machine is kept consistent during replay. As a result, one can stop replaying the original execution and allow the virtual machine to smoothly enter a live execution at any given point without worrying about possible inconsistencies. In contrast, most other replay techniques fail to achieve this because they often introduce inconsistency in the system when "tricking" the target process into executing in the same way as it did before. For example, a common way to deal with system calls in these replay techniques is to mimic the same effect from the kernel as at the recording time without actually executing the system call during replay. In this way, the inconsistency between kernel and user process can prevent the process from continuing live execution after a period of replay.

A downside of virtual machine record/replay is that it is on a very low level and it is very difficult for external programs to separate and analyze the behavior of a specific user-level process during replay. Yet, such analysis is essential for many debugging and bug detection tasks.

VAssert is a technique developed by VMware, Inc. to assist debugging by allowing the assert-checking to be delayed to replay time and is described in U.S. Patent Publication 2009/0327574 filed Jun. 27, 2008 and entitled "Replay Time Only Functionalities," the entire contents of which is incorporated by reference for all purposes. Essentially, VAssert allows a program to take a "detour" in replay to execute different code, i.e., correctness checking code or logging code. A feature of VAssert is to provide programmers a way to shift expensive checking and logging into replay time so that the there is almost no disturbance in recording.

When a piece of code is put in a VAssert block, it is skipped in normal execution or during recording, and is only executed in replay. The "side-effect" of this piece of code is removed if the correctness checking passes so that the determinism of replay is guaranteed. If the correctness checking fails, it invokes programmer-specified callbacks and/or allows a programmer to attach debugger code to the application process.

In addition, VAssert offers a mechanism in which the virtual machine can switch to live execution after executing some replay-only code. This functionality provides convenient support for changing the replay execution at one point in the execution and testing the program behavior caused by this change. In some aspects, VAssert provides a bridge over the gap between the virtual machine record/replay and application specific analysis.

Embodiments use an instrumentation tool known as Valgrind. Valgrind is a software system for debugging and profiling Linux programs available under the GPL licensing program. The Valgrind tool suite can be used to automatically detect many memory management and threading bugs. More information about Valgrind is available at valgrind.org. The Valgrind tool runs on several popular platforms, such as x86/Linux, AMD64/Linux and PPC32/Linux. Valgrind works with all the major Linux distributions, including Red Hat, SuSE, Debian, Gentoo, Slackwar and Mandrake. Valgrind uses dynamic binary instrumentation, so it is not necessary to modify, recompile or relink an application.

Figure 3:
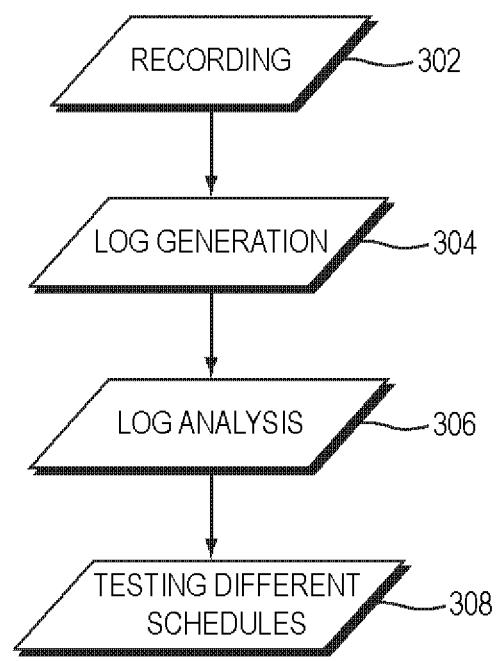
FIG. 3 is an overview of the phases of an embodiment of the present invention.

Referring now to FIG. 3, embodiments of the present invention include, generally, four phases. In a first phase 302, the execution of a test of the target multi-threaded application is recorded. Although the test will involve some locking activity in the application, more often than not it does not trigger a deadlock. Then, in a second phase 304 the execution is replayed once, and a trace log of all locking activities that happened during the test is generated. After that, in a third phase 306, the log is analyzed off-line and the cases where deadlocks can potentially be triggered, if the scheduling is changed, are identified. Based on the analysis and identification, in a fourth phase 308, each potential case is tested by replaying the execution with the specified scheduling changes Recording Phase During the recording phase, the execution of the target multi-threaded application is recorded. In one embodiment, this phase can be integrated along with any other in-house software testing in practice. Any test case could be used for creating the recordings. However, as different from current practice in exposing concurrency bugs by stress testing, the best tests to expose deadlocks with embodiments of the present invention are those that run many different types of transactions concurrently instead of only running a few types of transactions repetitively. As embodiments will change the scheduling in a guided manner, there is no need for the test itself to cover many scheduling cases by repeating the same execution again and again.

As it is intended to be a part of a testing procedure, one concern may be the overhead incurred. If a large overhead is introduced in this phase, the testing cycle could be increased too much and the overall usability may be diminished. Embodiments leverage the lightweight virtual machine recording and VAssert to shift the tracing and analysis to replay time, therefore, the overhead of the testing phase can be controlled.

Log Generation

Figure 4:
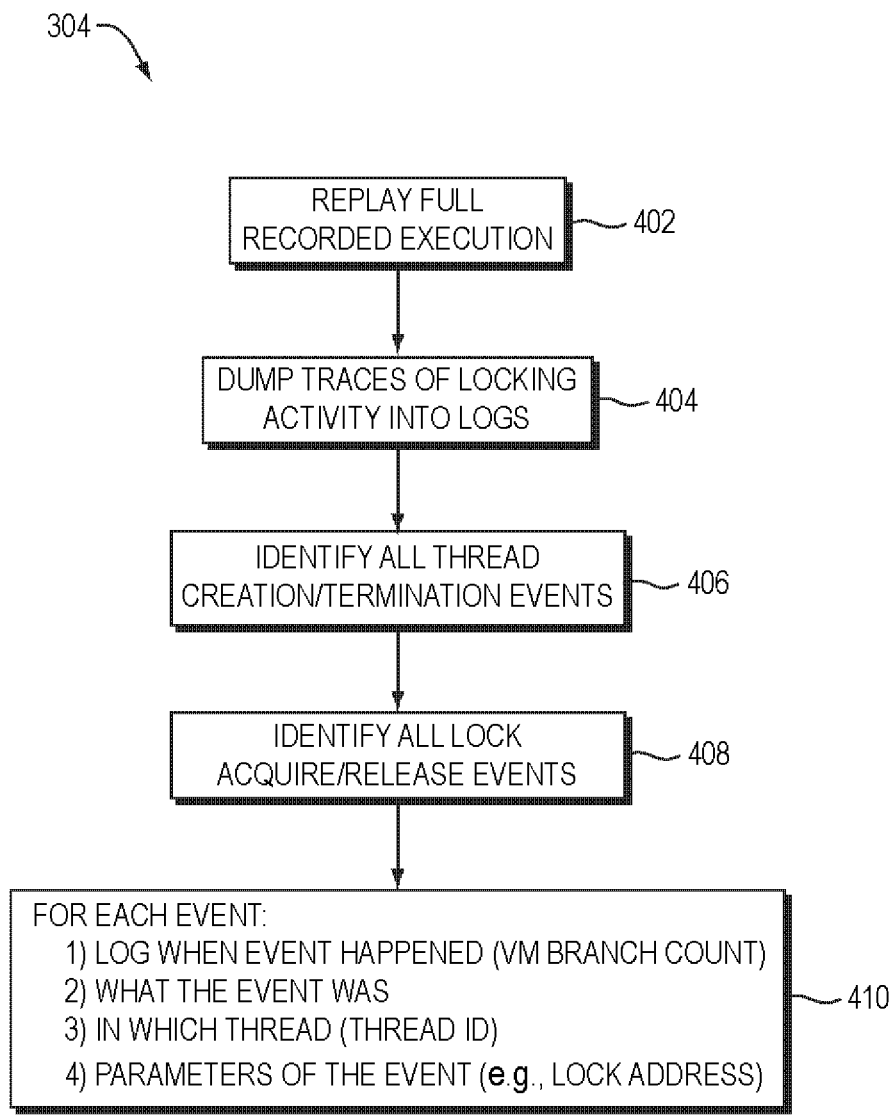
FIG. 4 is a flow-chart representing a log generation phase of an embodiment of the present invention.

In the log generation phase 304, the full recorded execution is replayed, step 402, referring to FIG. 4, to dump, step 404, the trace of locking activities into logs. During replay, VAssert's capacity for executing different code and generating a log is leveraged. The log includes, step 406, all the thread creation/termination events and, step 408, the lock acquire/release events. Specifically, for each event, step 410, information is logged, for example, when the event happened (indicated by the VM branch count), which event happened e.g., acquire lock, in which thread the event happened, indicated by thread id, and parameters of the event, e.g., lock address.

The execution time of the log generator phase 304, partly depends on how many events needed to be logged. The implementation of VAssert involves non-trivial overhead for executing each VAssert block and the time might be a concern. However, as the embodiments are not targeting the stress test case, the execution time is usually not intolerable. In addition, the log generation phase 304 is not in the critical path of general testing and requires no human supervision, so it can be scheduled as a batch job. Furthermore, it is possible to further optimize by cutting the recording into pieces and replaying them in parallel.

Log Analysis

Figure 5:
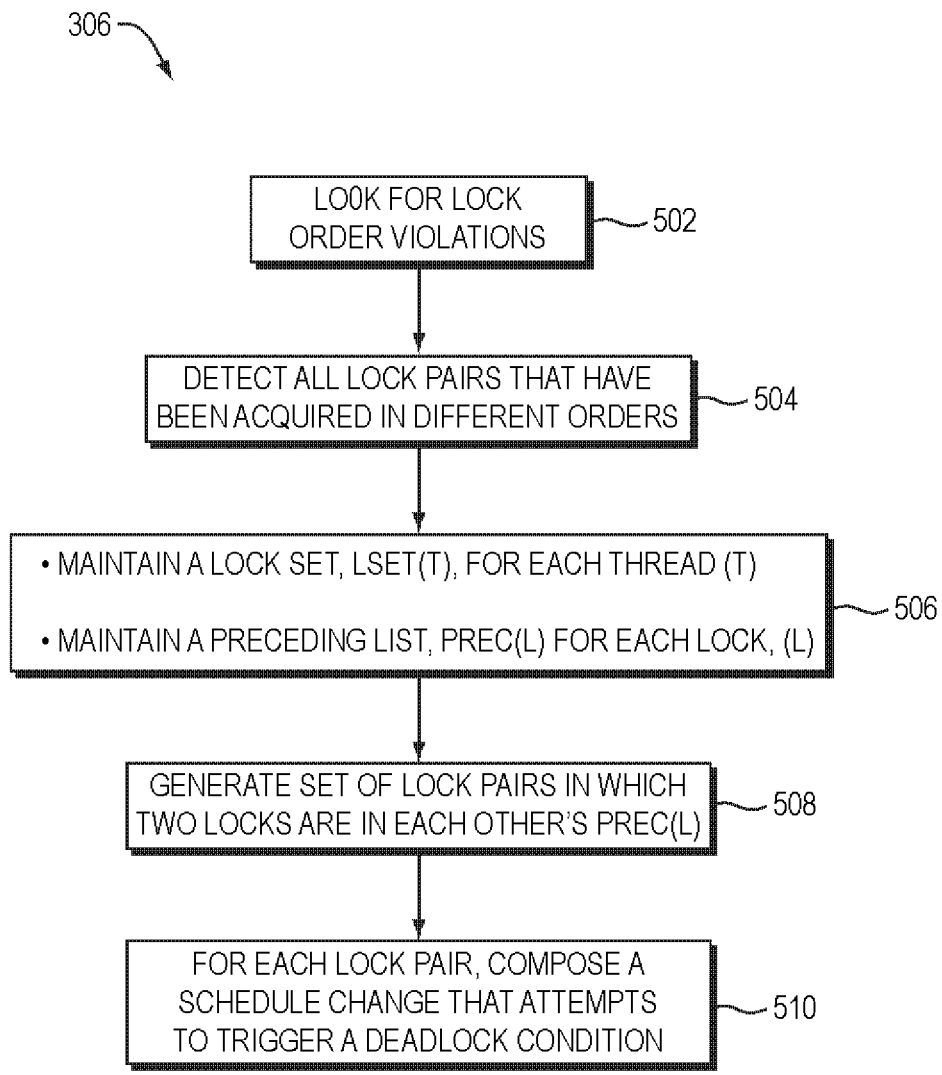
FIG. 5 is a flow-chart representing a log analysis phase of an embodiment of the present invention.
Figure 6:
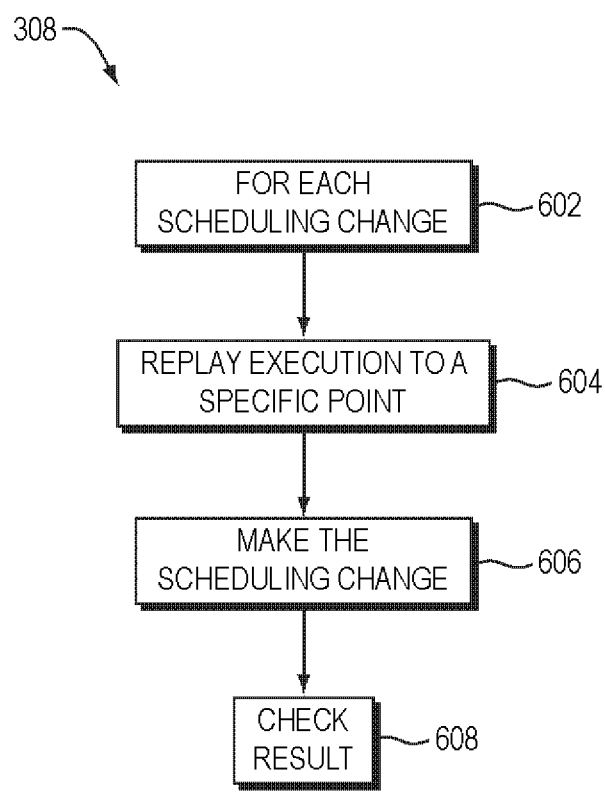
FIG. 6 is a flow-chart representing a testing phase of an embodiment of the present invention.

In the log analysis phase 306, the generated event log is processed to identify the potential deadlocks as shown in FIG. 5. Specifically, step 502, lock order violations are identified. In one embodiment, the lock order violation between two threads is identified, step 504. Alternatively, the potential deadlock case where more than two threads form a cycle in a dependency graph with more than two locks may be identified.

In step 506, all the lock pairs that have been acquired in different orders are identified. Specifically, when scanning through the whole log, the analyzer maintains a lock set LSet(T) for each thread T and a preceding list Prec(L) for each lock L. When a thread T acquires a lock L, the analyzer adds the locks that are already in LSet(T) into Prec(L), i.e., Prec(L)=Prec(L)∪LSet(T), and then it adds the lock L into LSet(T), i.e., LSet(T)=LSet(T)∪L. When a thread T releases lock L, the analyzer removes the lock from its lock set, i.e., LSet(T)=LSet(T)−L. At the end of step 506, the preceding list Prec(L) contains all the locks that can be acquired before L. In step 508, the lock pairs in which two locks are in each other's preceding list will be noted and passed to the next step.

In step 510, the analyzer reviews each lock pair that has been identified, e.g., (L(A), L(B)), and composes a scheduling change that attempts to trigger a potential deadlock caused by these locks. Specifically, the analyzer focuses on the log entries related to these two locks and keeps track of all the lock sequences where a thread holds one lock and attempts to acquire the other. Each entry in a lock sequence set LSeq(T,L(A),L(B)) consists of two lock acquiring events, in which the first event is thread T acquiring lock L(A) and the next event is thread T acquiring lock L(B). After obtaining all the sets of LSeq(T,L(A),L(B)) and LSeq(T,L(B),L(A)) with all possible threads T, the analyzer then pairs the lock sequences to generate test cases of scheduling changes for lock pair (L(A), L(B)).

Referring to FIG. 8, each generated case then looks like: thread T1 acquires lock L(A) in event E1, and then requests lock L(B) in event E2, and later thread T2 acquires lock L(B) in event E3, and then requests lock L(A) in event E4. As shown in FIG. 8, the scheduling change to trigger a potential deadlock for this case is making the event E3 happen before event E2. Then after filtering out the impossible cases, e.g., where thread T2 is created after E2 (it is not possible for the event E3 on thread T2 to happen before event E2), the analyzer generates the scheduling changes that are likely to trigger a deadlock in execution.

Testing Potential Deadlock

In the testing phase 308, each scheduling change for exposing potential deadlocks is tried. For each scheduling change, step 602, one round of testing involving three steps is performed: a) step 604, replaying the execution to a certain point, b) step 606, making the scheduling change, and c) step 608, checking the result.

In step 604, the execution is replayed to the point where the first action for scheduling change must be introduced. Since from this point on, the virtual machine will switch to live execution, this point is referred to as the "go live" point, go_live. In the example above represented in FIG. 8, the go_live point is right before the event E2 happens, as the change in the scheduling from the case where event E3 happens after event E2 to event E3 happens before event E2. This step allows the program to reach the same stage where, as was analyzed earlier, a deadlock potentially can be introduced. In one embodiment, during the replay before the go_live point, all the VAssert blocks are skipped for better performance.

When the replay reaches the go_live point, the process stops the replay, step 604, and the virtual machine continues live execution. This is done by checking whether the program has reached the go_live point in the VAssert block during replay. The branch count in the virtual machine is used to precisely indicate the go_live point, because the instruction stream in replay is exactly the same as the original execution.

Before returning the control to the program, in accordance with one embodiment, scheduling change is introduced to thread T1, step 606, the application thread where the event E2 happens. At this point, the system puts down a semaphore that was initialized to 0 to block the execution of thread T1. The semaphore will be put up later after the event E3 so that event E3 is made to happen before event E2.

It should be noted here that after going live, it may not be known when exactly event E3 will happen. Actually, it may not be certain that event E3 will happen or not with the scheduling change done for blocking thread T1. It is possible that due to other synchronizations in the program, the event E3 will never happen and, in this case, there could never be such a deadlock.

To solve that potential problem, the action for putting up the semaphore is triggered by matching the signature of E3. Specifically, since event E3 is the event for thread T2 acquiring lock L(B), each lock activity is monitored for matches to thread_id, event type, and event parameter (lock address). If the signature matches, it is certain that an event equivalent to event E3 has happened. At some point after event E3, the tool puts up the semaphore to unblock thread T1 and lets it hit event E2. This way, the effect of letting event E3 happen before event E2 is achieved. If, due to other synchronization issues, no event like event E3 happens, the tool times out and declares that this potential deadlock does not exist. Since only the scheduling changes such that event E2 and E3 are very close to each other in original execution are chosen, a timeout on the order of, for example, ten seconds, is sufficient to allow event E3 to happen if thread T2's progress does not depend on thread T1.

If the events equivalent to events E3 and E4 are both reached, and the program becomes blocked, then it is certain that the program is deadlocked in the way that thread T1 is waiting for lock L(B) held by thread T2, and thread T2 is waiting for lock L(A) held by thread T1. In this case, step 608, the scheduling change is noted and the backtraces of the lock acquisition points (i.e., thread T1 acquires lock L(A), thread T1 requests lock L(B), thread T2 acquires lock L(B), and thread T3 requests lock L(A)) are noted.

Figure 7:
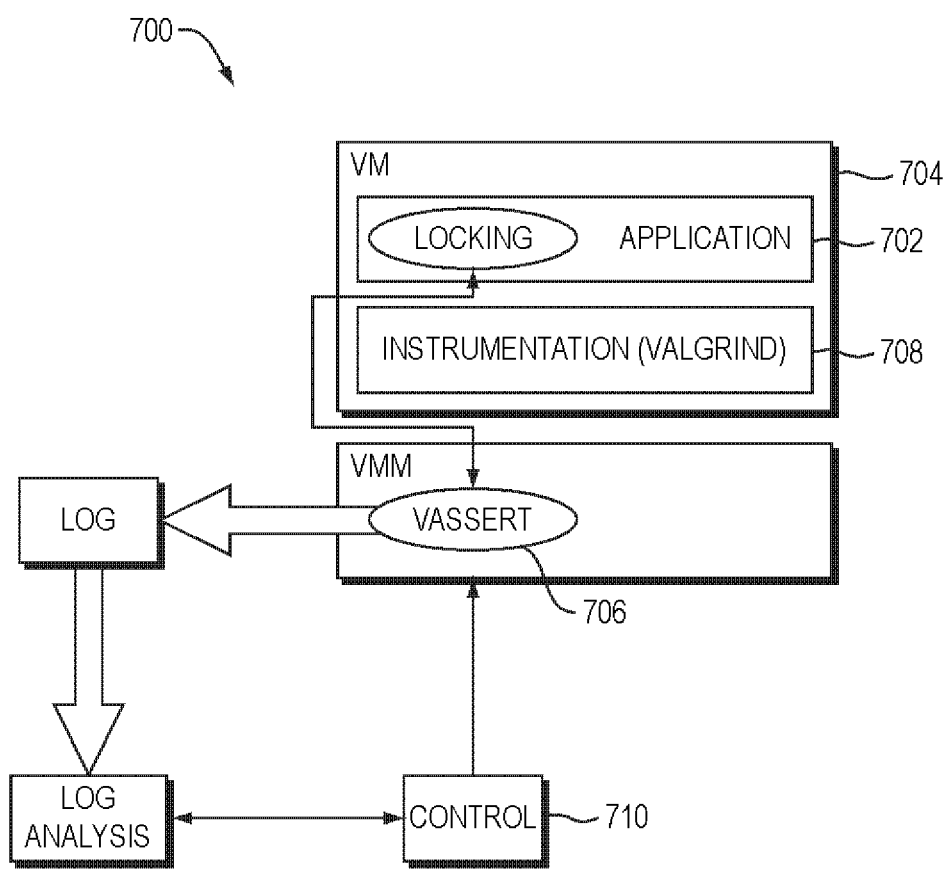
FIG. 7 is a block diagram representation of an embodiment of the present invention.

The overall system architecture 700 in accordance with one embodiment is shown in FIG. 7. The target application 702 runs in a virtual machine 704. The locking activities in the application will be associated with an instance of VAssert 706 for logging and making scheduling changes. As set forth above, there are three events associated with locking that will be logged: a thread requesting a lock (entry point of the lock function), a thread acquiring the lock (exit point of the lock function), and a thread releasing the lock (an unlock function). For manifesting a deadlock, a semaphore can be put up or down at any of these points. Both logging and putting up/down a semaphore are done by using VAssert's ability to execute different code during replay.

It is noted that VAssert requires the code executed in replay be part of the application binary, however, it is desirable to use an unmodified application binary for better portability. To overcome this challenge, the instrumentation tool Valgrind 708 is used to instrument the replay-only code into the application. Specifically, the instrumentation tool 708 will "hijack" all the lock activities in the application 702 and add wrappers to the lock/unlock functions. The code wrapping around lock/unlock functions is put in VAssert blocks so that during recording, the wrapping code is skipped and does not incur analysis overhead. Note that the instrumentation overhead for running the program under the instrumentation tool and hijacking the lock/unlock functions will still be incurred as this part of overhead depends on the instrumentation tool itself. An instrumentation tool under Valgrind was created for holding the replay-only code and instrumenting the lock activities.

In order to automate the testing procedure, a control script 710 takes multiple recorded executions as input to manifest potential deadlocks in each of them. It automatically goes over the major part of the testing by replaying the execution multiple times under different setups for different purposes. It also organizes the results by each test (recording) and further by each scheduling change case.

Demonstration of Effectiveness

An embodiment of the present invention was applied against a real deadlock bug in MySQL-6.0.4 that was introduced by MySQL developers. In the MySQL case, the deadlock only occurs when two transactions doing insert and truncate interfere with each other. Basically, the insert transaction will acquire a lock on the log first and a lock on the table later, while the truncate transaction will acquire a lock first on the table then on the log. If it happens that both threads successfully acquire the first lock, they will both then block on the second lock and enter a deadlock situation.

This deadlock case is difficult to detect and reproduce as the original report of the bug contains a test that runs 1,000,000 times, with insert and truncate at the same time, and in a loop in order to consistently reproduce the deadlock. Manually attempting the tests with only 100,000 iterations, fails to reproduce the deadlock consistently although each test with 100,000 iterations takes around 16 minutes.

With the disclosed process, this deadlock bug has been consistently reproduced with just one iteration of the concurrent insert and truncate. The pairs of locks that are acquired in different orders by multiple threads were identified and the most likely cases from each of the lock pairs were picked to make the scheduling changes. The scheduling changes made on the bug-inducing lock pair effectively triggered the deadlock, and the backtraces of the involved threads acquiring both locks were generated. Moreover, the present invention automatically ruled out the cases where violating lock order does not cause deadlock and thereby no false positives were reported.

Embodiments are very effective in exposing hidden deadlock bugs without stress testing many iterations. This is advantageous because it allows the invention to work well with functionality tests and is, therefore, a good supplement to the existing testing of concurrency software.

The embodiments provide a number of advantages over previous methods. First, a larger test coverage is provided as this approach does not require the deadlock to manifest itself in testing. Instead, it is based on the potential deadlock occurring in the program and attempts to trigger a real deadlock by changing the event scheduling. As a result, the coverage of testing the interleaved cases is greatly increased to include those cases not reached by known current testing execution.

Second, the false positives are reduced or eliminated as a result of this approach. Errors are reported only if the execution results in a deadlock being created by the scheduling change in replay.

Third, more helpful information is provided to the developer to aid in diagnosing software bugs. This approach not only provides accurate and detailed bug information, e.g., which locks are involved in the deadlock, when they are acquired at which threads, etc., but also creates an execution from a replay with the bug manifested. Therefore, the deadlock is consistently reproducible.

The foregoing embodiments of the present invention may be implemented on one or more of the products available from VMware, Inc. of Palo Alto, Calif.

It is to be appreciated that embodiments of the methods and apparatuses discussed herein are not limited in application to the details of construction and the arrangement of components or steps set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one of the embodiments are not intended to be excluded from a similar role in any other embodiments. Also, the phraseology and terminology used herein are for the purpose of description and should not be regarded as limiting. The use herein of "including," "comprising," "having," "containing," "involving," and variations thereof, is meant to encompass the items listed thereafter and equivalents thereof as well as additional items.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g., diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention.

It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of identifying potential deadlock conditions in a target multithreaded software application running within a virtual machine in a virtualized computer system, the method comprising:
   recording an execution of the software application in the virtual machine, wherein the software application includes a code block that is skipped during the recording;
   identifying all thread creation and thread termination events that occur in the executed software application and a first order in which the identified events occur during the execution of the software application;
   identifying all resource locking and resource releasing events in the executed software application;
   generating a second order of events of the software application that is different from the first order of events and potentially triggers a deadlock condition due to timing of the resource locking and resource releasing events;
   initiating, by a hypervisor, a replay of the software application in the virtual machine based on the recording of the execution of the software application
   determining, by the hypervisor, the code block that was skipped during the recording in the virtual machine and executing the code block during the replay;
   monitoring, by the hypervisor, execution of the replay of the software application by the virtual machine to determine when execution of the replay in the virtual machine reaches a point in the replay of the software application within the code block where the second order of events differs from the first order of events;
   in response to determining the point, introducing, by the hypervisor, a scheduling change to execute the software application in the virtual machine with the generated second order of events; and
   in response to determining the point, automatically switching from replaying of the software application using the recording from within the code block to executing the software application in the virtual machine with the generated second order of events to determine whether the potential deadlock condition is triggered.

2. The method of claim 1, further comprising:
   identifying at least one resource lock order violation occurring between a pair of identified threads in the executed software application.

3. The method of claim 2, wherein identifying the at least one resource lock order violation comprises:
   identifying all lock pairs of two different resource locks that have been acquired in different orders.

4. The method of claim 3, wherein identifying the lock pairs comprises:
   determining, for each thread in the software application, a set of acquired resource locks by the each thread; and
   determining, for each resource, a preceding list set of other resources that are locked prior to the respective resource being locked.

5. The method of claim 4, wherein the second order of events is generated as a function of the preceding list set.

6. The method of claim 1, further comprising:
   creating a log of events occurring during the execution of the software application.

7. The method of claim 6, further comprising analyzing the log of events, wherein analyzing the log of events comprises:
   maintaining a lock set, LSet(T), indicating locks currently set for a respective thread T;
   maintaining a preceding list, Prec(L), indicating locks acquired before a respective lock L;
   when it is determined that a thread T acquires a lock L during the execution of the software application then adding the locks that are already in the lock set LSet(T) into the preceding list Prec(L), and then adding the lock L into the lock set LSet(T);
   when a thread T releases a lock L, removing the lock L from the thread T lock set, LSet(T)=LSet(T)−L; and
   identifying, from the preceding lists, Prec(L), for all locks, those lock pairs in which two locks are in each other's preceding list Prec(L).

8. The method of claim 7, wherein the second order of events is a function of those lock pairs (L(A), L(B)), in which two locks are in each other's respective preceding list Prec(L).

9. The method of claim 8, wherein generating the second order of events comprises:
   for each lock pair (L(A), L(B)) that has been identified, maintaining a lock sequence set LSeq(T,L(A),L(B)) that consists of two lock acquiring events, L(A), L(B), in which a first event is thread T acquiring lock A, L(A), and a next event is thread T acquiring lock B, L(B);
   obtaining all sets of LSeq(T,L(A),L(B)) and LSeq(T,L(B), L(A)) with all possible threads T; and
   pairing the lock sequences to generate test cases of scheduling changes for lock pair (L(A), L(B)).

10. The method of claim 6, wherein creating the log comprises:
    tracking resource locking and resource releasing activities; and
    identifying thread creation and thread termination activities.

11. The method of claim 1, wherein:
    the point comprises a go_live point where the second order of events begins to differ from the first order of events, and
    executing the software application comprises executing the software application live in the virtual machine from the go_live point forward.

12. A computer program product stored on a non-transitory computer readable medium and configured to perform a method of identifying potential deadlock conditions in a target multithreaded software application running within a virtual machine in a virtualized computer system, the method comprising:
    recording an execution of the software application in the virtual machine, wherein the software application includes a code block that is skipped during the recording;
    identifying all thread creation and thread termination events that occur in the executed software application and a first order in which the identified events occur during the execution of the software application;

identifying all resource locking and resource releasing events in the executed software application;

generating a second order of events of the software application that is different from the first order of events and potentially triggers a deadlock condition due to timing of the resource locking and resource releasing events;

initiating, by a hypervisor, a replay of the software application in the virtual machine based on the recording of the execution of the software application determining, by the hypervisor, the code block that was skipped during the recording in the virtual machine and executing the code block during the replay;

monitoring, by the hypervisor, execution of the replay of the software application by the virtual machine to determine when execution of the replay in the virtual machine reaches a point in the replay of the software application within the code block where the second order of events differs from the first order of events;

in response to determining the point, introducing, by the hypervisor, a scheduling change to execute the software application in the virtual machine with the generated second order of events; and in response to determining the point, automatically switching from replaying of the software application using the recording from within the code block to executing the software application in the virtual machine with the generated second order of events to determine whether the potential deadlock condition is triggered.

13. The computer program product of claim 12, the method further comprising:
identifying at least one resource lock order violation occurring between a pair of identified threads in the executed software application.

14. The computer program product of claim 13, wherein identifying the at least one resource lock order violation comprises:
identifying all lock pairs of two different resource locks that have been acquired in different orders.

15. The computer program product of claim 14, wherein identifying the lock pairs comprises:
determining a set of acquired resource locks for each thread in the software application; and
determining, for each resource, a preceding list set of other resources that are locked prior to the respective resource being locked.

16. The computer program product of claim 15, wherein the second order of events is generated as a function of the preceding list set.

17. The computer program product of claim 12, the method further comprising:
creating a log of events occurring during the execution of the software application.

18. The computer program product of claim 17, the method further comprising analyzing the log of events, wherein analyzing the log of events comprises:
maintaining a lock set, LSet(T), indicating locks currently set for a respective thread T;
maintaining a preceding list, Prec(L), indicating locks acquired before a respective lock L;
when it is determined that a thread T acquires a lock L during the execution of the software application then adding the locks that are already in the lock set LSet(T) into the preceding list Prec(L), and then adding the lock L into the lock set LSet(T);
when a thread T releases a lock L, removing the lock L from the thread T lock set, LSet(T)=LSet(T)−L; and
identifying, from the preceding lists, Prec(L), for all locks, those lock pairs in which two locks are in each other's preceding list Prec(L).

19. The computer program product of claim 18, wherein the second order of events is a function of those lock pairs (L(A), L(B)), in which two locks are in each other's respective preceding list Prec(L).

20. The computer program product of claim 19, wherein generating the second order of events comprises:
for each lock pair (L(A), L(B)) that has been identified, maintaining a lock sequence set LSeq(T,L(A),L(B)) that consists of two lock acquiring events, L(A), L(B), in which a first event is thread T acquiring lock A, L(A), and a next event is thread T acquiring lock B, L(B);
obtaining all sets of LSeq(T,L(A),L(B)) and LSeq(T,L(B), L(A)) with all possible threads T; and
pairing the lock sequences to generate test cases of scheduling changes for lock pair (L(A), L(B)).

21. The computer program product of claim 17, wherein creating the log comprises:
tracking resource locking and resource releasing activities; and
identifying thread creation and thread termination activities.

22. The computer program product of claim 12, wherein:
the point comprises a go_live point where the second order of events begins to differ from the first order of events, and
executing the software application comprises executing the software application live in the virtual machine from the go_live point forward.

23. A system comprising:
one or more computer processors; and
a non-transitory computer-readable storage medium comprising virtualization logic for identifying potential deadlock conditions in a software application running in a corresponding virtual machine (VM) that is running a target multithreaded software application, wherein the virtualization logic, when executed, control the one or more computer processors to be configured for:
recording an execution of the software application in the virtual machine, wherein the software application includes a code block that is skipped during the recording;
identifying all thread creation and thread termination events that occur in the executed software application and a first order in which the identified events occur during the execution of the software application;
identifying all resource locking and resource releasing events in the executed software application;
generating a second order of events of the software application that is different from the first order of events and potentially triggers a deadlock condition due to timing of the resource locking and resource releasing events;
initiating, by a hypervisor, a replay of the software application in the virtual machine based on the recording of the execution of the software application
determining, by the hypervisor, the code block that was skipped during the recording in the virtual machine and executing the code block during the replay;
monitoring, by the hypervisor, execution of the replay of the software application by the virtual machine to determine when execution of the replay in the virtual machine reaches a point in the replay of the software application within the code block where the second order of events differs from the first order of events;

in response to determining the point, introducing, by the hypervisor, a scheduling change to execute the software application in the virtual machine with the generated second order of events; and in response to determining the point, automatically switching from replaying of the software application using the recording from within the code block to executing the software application in the virtual machine with the generated second order of events to determine whether the potential deadlock condition is triggered.

24. The system of claim 23, further configured for:
identifying at least one resource lock order violation occurring between a pair of identified threads in the executed software application.

25. The system of claim 24, wherein identifying the at least one resource lock order violation comprises:
the virtualization logic identifying all lock pairs of two different resource locks that have been acquired in different orders.

26. The system of claim 25, wherein identifying the lock pairs comprises:
the virtualization logic determining a set of acquired resource locks for each thread in the software application; and
the virtualization logic determining, for each resource, a preceding list set of other resources that are locked prior to the respective resource being locked.

27. The system claim 26, wherein the second order of events is generated as a function of the preceding list set.

28. The system of claim 23, further configured for:
the virtualization logic creating a log of events occurring during the execution of the software application.

29. The system of claim 28, further configured for analyzing the log of events, wherein analyzing the log of events comprises:
the virtualization logic maintaining a lock set, LSet(T), indicating locks currently set for a respective thread T;
the virtualization logic maintaining a preceding list, Prec(L), indicating locks acquired before a respective lock L;
when it is determined that a thread T acquires a lock L during the execution of the software application then the virtualization logic adding the locks that are already in the lock set LSet(T) into the preceding list Prec(L), and then adding the lock L into the lock set LSet(T);
when a thread T releases a lock L, the virtualization logic removing the lock L from the thread T lock set, LSet(T) =LSet(T)−L; and
the virtualization logic identifying, from the preceding lists, Prec(L), for all locks, those lock pairs in which two locks are in each other's preceding list Prec(L).

30. The system of claim 29, wherein the second order of events is a function of those lock pairs (L(A), L(B)), in which two locks are in each other's respective preceding list Prec(L).

31. The system of claim 30, wherein generating the second order of events comprises:
for each lock pair (L(A), L(B)) that has been identified, the virtualization logic maintaining a lock sequence set LSeq(T,L(A),L(B)) that consists of two lock acquiring events, L(A), L(B), in which a first event is thread T acquiring lock A, L(A), and a next event is thread T acquiring lock B, L(B);
the virtualization logic obtaining all sets of LSeq(T,L(A), L(B)) and LSeq(T,L(B),L(A)) with all possible threads T; and
the virtualization logic pairing the lock sequences to generate test cases of scheduling changes for lock pair (L(A), L(B)).

32. The system of claim 28, wherein creating the log comprises:
the virtualization logic tracking resource locking and resource releasing activities; and
the virtualization logic identifying thread creation and thread termination activities.

33. The system of claim 23, wherein:
the point comprises a go_live point where the second order of events begins to differ from the first order of events, and
the virtualization logic executing the software application comprises the virtualization logic executing the software application live in the virtual machine from the go_live point forward.

* * * * *